Patented Aug. 7, 1951

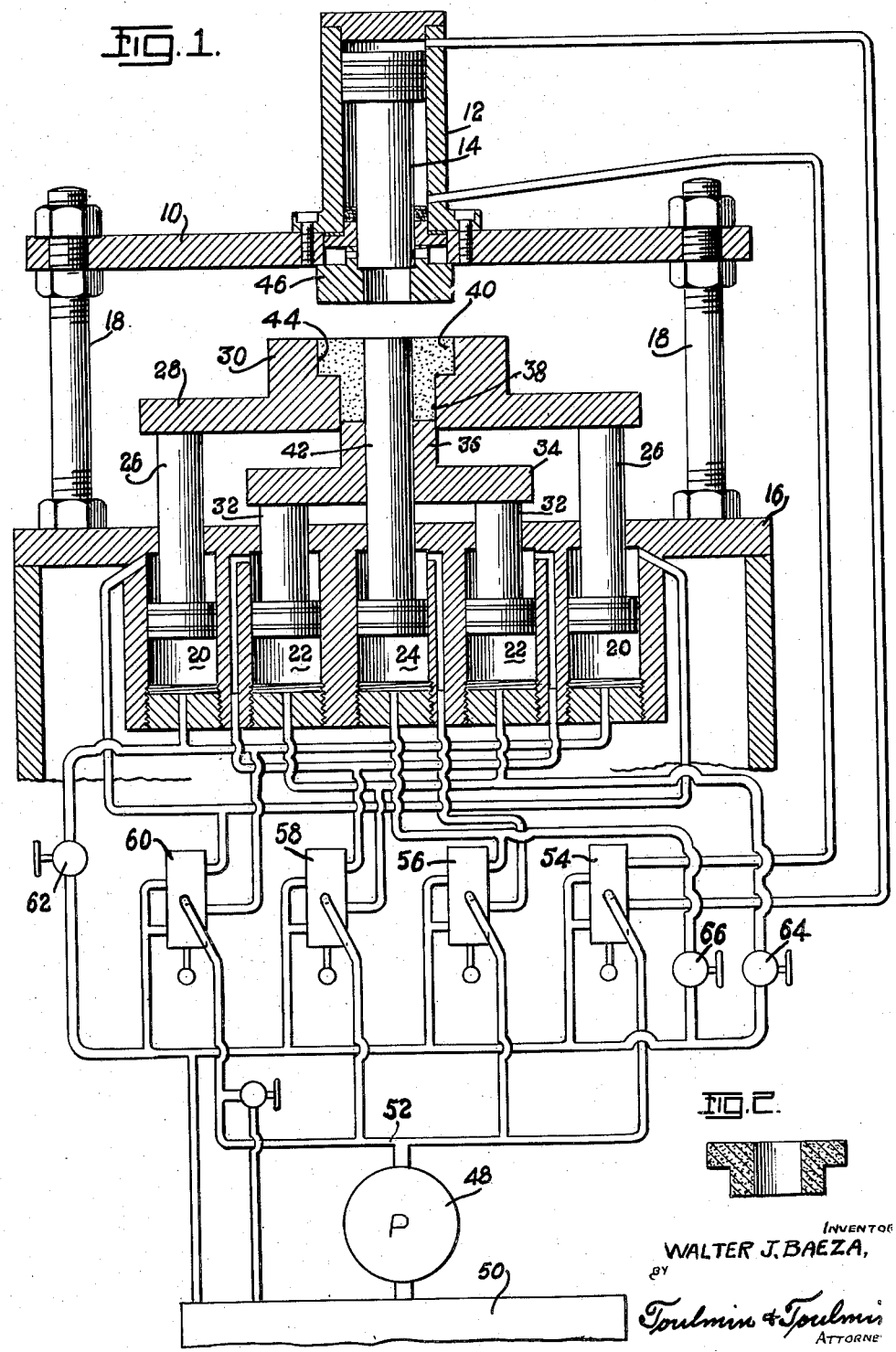

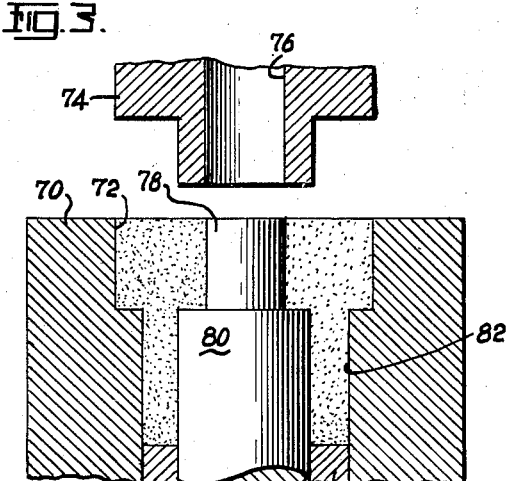
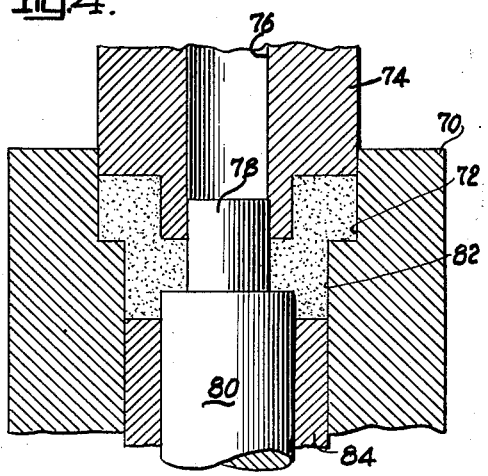
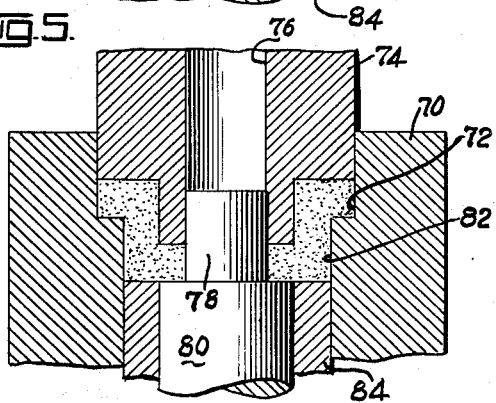
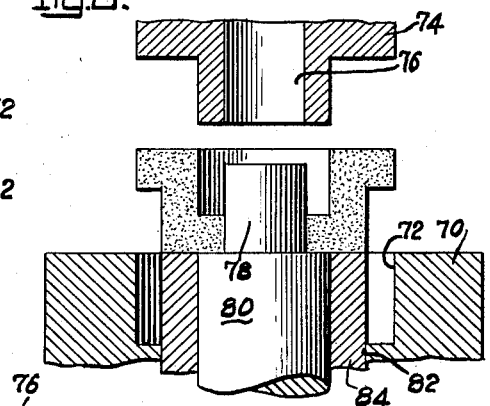
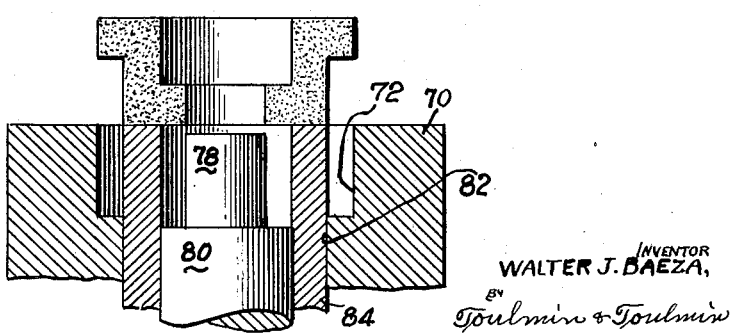

2,562,876

UNITED STATES PATENT OFFICE 2,562,876

APPARATUS FOR MOLDING FLANGED WORKPIECES

Walter J. Baëza, New York, N. Y., assignor to H-P-M Development Corporation, Wilmington, Del., a corporation of Delaware Application November 17, 1945, Serial No. 629,232

3 Claims. (Cl. 78—0.5)

This invention relates to apparatus for molding granulated materials, and is particularly concerned with apparatus for molding such materials into flanged workpieces.

There are many instances where workpieces having flanges are required, such as bearings, bushings, etc. In many cases, such a workpiece is most economically formed from granulated materials such as powdered metals. However, great difficulty has been experienced in molding such a workpiece so that it has uniform strength throughout, the tendency being for the article to fracture where the flanges join.

In order to form a workpiece having flanges disposed at different angles, and to have the completed workpiece uniformly strong throughout, it is necessary that the material be moved during molding so as to eliminate planes of shearing stress. It is also important that adjacent parts of the material being molded move at the same rate of speed so that the compacting of the material is exactly uniform throughout the volume of the article being molded.

By observing these requirements, it is possible to mold workpieces having both axial and transverse flanges thereon and to produce an article which is accurately sized, uniformly compact and strong, and adequately serviceable.

Accordingly, the primary object of this invention is to provide an improved apparatus for molding flanged workpieces which substantially eliminates points of weakness within such workpieces.

Another object is to provide an apparatus for forming multi-flanged workpieces which enables the workpiece to be accurately sized and uniformly compacted.

It is another object to provide apparatus for compacting multi-flanged workpieces from granulated materials which substantially eliminates planes of shearing stress and which thus results in a more uniformly strong product.

Still another object is to provide an apparatus for molding flanged workpieces such that the volume of material which the apparatus will receive is the correct quantity for correctly sizing the finished workpiece.

These and other objects and advantages become more apparent upon reference to the following specification taken together with the accompanying drawings in which:

Figure 1 is a vertical section view taken through an apparatus according to this invention;

Figure 2 is a cross section through a workpiece formed in the apparatus of Figure 1; and Figures 3 through 7 are fragmentary vertical sectional views of another form of pressing apparatus according to this invention in the various stages of a pressing cycle.

Referring to the drawings, and in particular to Figures 1 and 2, the apparatus shown therein comprises a press head 10 which mounts a fluid motor 12 having the work plunger 14.

The head 10 is connected with a base 16 by a plurality of strain rods 18 which absorb the thrust of the pressing operation.

The base 16 comprises a plurality of cylinders indicated at 20, 22 and 24, the first two mentioned being arranged in pairs. Reciprocably mounted in the cylinders 20 are the plungers 26 which mount a platen 28 that either comprises or carries a mold body 30.

The cylinders 22 have reciprocably mounted therein the plungers 32 which mount a platen 34 that is either integral with or carries a sleeve member 36 adapted for entering the portion 38 of the cavity 40 in the mold 30 for forming a bottom for the said cavity.

The cylinder 24 reciprocably receives the plunger 42 which extends vertically upward through the mold cavity 40 and forms a core member to define a central cavity in the workpiece to be formed.

The mold cavity 40 also comprises the upper and larger portion 44. Secured to the plunger 14 is a pressing plunger 46 which is closely received within the portion 44 of the cavity 40.

For actuating the various platens and pressing plungers, there is provided a pump 48 which draws fluid from a reservoir 50 and discharges the said fluid at increased pressure into a conduit 52. The conduit 52 leads to the inlet of a plurality of 4-way valves 54, 56, 58, and 60 which are connected to supply the several pressing plungers.

During the pressing operation, the platens and the core are permitted to yield at predetermined pressures or at predetermined rates which are determined by pressure responsive or flow responsive control valves connected therewith. For example, the cylinders 20 are connected to discharge fluid through a valve 62 which may be either pressure responsive or flow responsive to control the movement of the plungers 26 and platen 28 according to a predetermined pressure thereon, or in accordance with a predetermined rate of movement thereof.

The cylinders 22 are similarly connected with a valve 64 responsive to pressure or fluid flow, and the cylinder 24 is connected with a valve 66 for performing the same function.

When the platens and core are in their Figure 1 position, and the cavity 40 is filled level full, and after the plunger 14 is actuated to drive the pressing plunger 46 downwardly, the material will be pressed into the configuration shown in Figure 2. It will be noted that the axial distance through the workpiece at any point is substantially a fixed fraction of the axial distance through the unpressed material at the same point. Thus, the workpiece is uniformly compacted throughout and has no zones of lesser compactness to detract from the strength and serviceability of the article.

During the pressing cycle, the core 42 and the platens 28 and 34 yield simultaneously so that there is continuous relative movement between the mold body, the mold bottom, the mold core and pressing plunger. All parts of the workpiece are therefore in movement during pressing and, by adjusting the rates of movement of the various parts of the mold, all planes of shearing stress may be eliminated and the desired high strength article produced.

Referring to Figures 3 through 7, there is shown a somewhat modified arrangement wherein a workpiece is pressed which has a central axial portion, and opposite end portions consisting of transverse flanges, one of which extends outwardly and the other inwardly.

The apparatus shown in these figures comprises a mold body 70 having a stepped bore 72 adapted for receiving the stepped plunger 74. The plunger 74 is bored as at 76 to telescope with the reduced diameter end 78 of a core plunger 80. The diameter of the larger portion of the core plunger 80 is smaller than the diameter 82 of the smaller portion of the cavity of the mold 70, and there is disposed between the said bore and the mold a sleeve 84. The sleeve 84 together with the shoulder on the core plunger and the shoulder in the mold body form the mold bottom against which the mold material is pressed.

In operation, the mold cavity is filled as is shown in Figure 3. Thereafter the plunger 74 is moved downwardly and the sleeve 84 is moved upwardly. Simultaneously, the core plunger 80 moves downward. This stage of the cycle is shown in Figure 4. This continues until the parts occupy the position illustrated in Figure 5 wherein the workpiece is fully formed. It will be noted that the axial distance through the formed workpiece at any point is substantially a fixed percentage of the axial distance through the unmolded material at the same point.

In Figure 6, the workpiece is partially ejected by the retraction of the plunger 74 and the movement upwardly of the core plunger 80 and the sleeve 84. The simultaneous upward movement of the plunger and sleeve removes the workpiece from the mold cavity without stressing the upper flange. Thereafter, the core plunger is retracted downwardly to its Figure 7 position, and the workpiece is fully ejected. Then, the parts of the mold may be returned to their Figure 3 position, a new charge of material supplied, and another workpiece molded.

It will be understood that this invention is susceptible to modification in order to adopt it to different usages and conditions and, accordingly, it is desired to comprehend such modifications within this invention as may fall within the scope of the appended claims.

I claim:

1. In an apparatus for molding flanged workpieces from granular materials; a mold having a cavity provided with a ledge forming a part bottom for said cavity; a first fluid-pressure-responsive means for moving said mold; a sleeve reciprocable in the cavity of said mold and forming another part bottom therefor; a second fluid-pressure-responsive means for moving said sleeve; a core reciprocable in said sleeve and within said mold and providing an inner side wall for the cavity of said mold; a third fluid-pressure-responsive means connected to move said core; a pressing plunger arranged to move into the cavity of said mold from the side opposite the bottom thereof for applying molding pressure to materials positioned within said cavity; and separate fluid-pressure-responsive valve means connected with each of said first, second and third fluid-pressure-responsive means for permitting said mold, sleeve and core to yield in the direction of movement of said pressing plunger at different intervals during application of molding pressures to material within the cavity of said mold, whereby to provide for relative movement of all material-engaging surfaces of said apparatus during molding operations.

2. In an apparatus for molding flanged workpieces from granulated materials; a mold having a cavity and ledge forming a part bottom for said cavity; a sleeve reciprocable in said cavity and forming another part bottom therefor; a core reciprocable in said sleeve and mold and having a reduced diameter upper portion forming still another part bottom for said cavity; a pressing plunger movable into said cavity from the side opposite the bottom thereof for applying molding pressure to material introduced within said cavity; means for moving said pressing plunger into said cavity; and fluid-pressure-responsive means connected with said mold, said sleeve, and said core and yieldable individually with respect to each in response to pressing movement of said plunger to cause relative movement between said mold, sleeve, core, and plunger during a pressing operation, said last-named means being operable to move said mold, said sleeve, and said core into desired relative positions at the end of a pressing cycle.

3. In apparatus for molding flanged workpieces from granular materials; a mold having a cavity and a ledge forming a part bottom for said cavity; a first fluid-pressure-responsive means for moving said mold; a sleeve reciprocable in the cavity of said mold and forming another part bottom therefor; a second fluid-pressure-responsive means for moving said sleeve relative to said mold; a core reciprocable in said sleeve and said mold and having a reduced diameter portion forming still another part bottom for the cavity of said mold; a third fluid-pressure-responsive means connected to move said core relative to said mold and said sleeve; a pressing plunger arranged to move within the cavity of said mold from the side opposite the bottom thereof for applying molding pressures to materials positioned within said cavity and through such materials to said mold, sleeve, and core; and separate pressure relief valves connected with each of said first, second, and third fluid-pressure-responsive means and operable individually for permitting said mold, sleeve, and core to yield in the direction of movement of said pressing plunger at different intervals during the application of molding pressures to materials within the cavity of said mold, said valves being adjustable to vary the pressures at which said first, second, and third fluid-pressure-responsive means may yield during molding operations.

WALTER J. BAËZA.

REFERENCES CITED

The following references are of record in the file of this patent:

UNITED STATES PATENTS

| Number | Name | Date |
| --- | --- | --- |
| 1,607,389 | Claus | Nov. 16, 1926 |
| 1,766,265 | Smith | June 24, 1930 |
| 2,300,302 | Morin | Oct. 27, 1942 |
| 2,350,971 | Pecker | June 6, 1944 |
| 2,357,407 | Kurtz | Sept. 5, 1944 |
| 2,389,561 | Stokes | Nov. 20, 1945 |
| 2,398,227 | Hubbert | Apr. 9, 1946 |